Aug. 3, 1926.　　　　　　　　　　　　　　　　　　1,594,423
H. E. MOUSE
COMBINED HEADLIGHT AND MOTOR METER
Filed Oct. 9, 1925
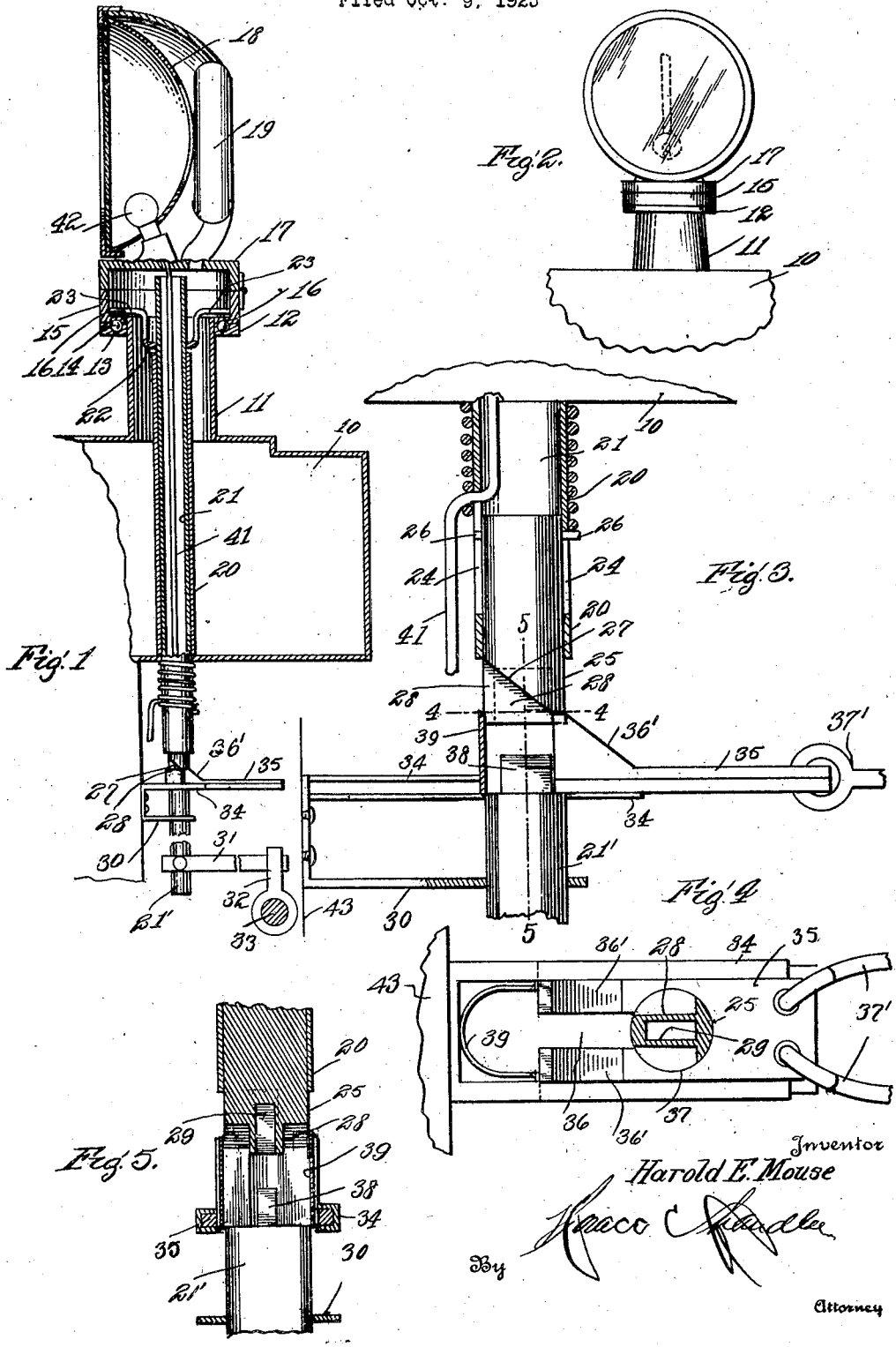

Patented Aug. 3, 1926.

1,594,423

UNITED STATES PATENT OFFICE.

HAROLD E. MOUSE, OF ELKINS, WEST VIRGINIA, ASSIGNOR OF ONE-HALF TO JAMES D. LONG, OF CANAAN, NEW HAMPSHIRE.

COMBINED HEADLIGHT AND MOTOR METER.

Application filed October 9, 1925. Serial No. 61,492.

This invention relates to new and useful improvements in automobile accessories, and particularly to headlights and motor meters.

One object of the invention is to provide a device of this character wherein an auxiliary headlight is mounted on the filling cap of the radiator of an automobile, and which is dirigible by the steering gear of the automobile.

Another object is to provide a device of this character which can be easily and quickly connected to and disconnected from the steering gear of the automobile, so that the driver may permit the auxiliary lamp to swing with the front wheels of the automobile, whereby to cast light on the inside of a curve in a road, or remain stationary.

Another object is to provide a construction of this character wherein when the lamp is engaged for rotary movement with the front wheels of the automobile, the light in the lamp will burn, while when disconnected from the steering gear, the electric circuit is broken, and the lamp extinguished.

Other objects and advantages will be apparent from the following description when taken in connection with the accompanying drawing.

In the drawing:

Figure 1 is a vertical sectional view through a portion of an automobile radiator and filling tube, showing the invention applied thereto.

Figure 2 is a front elevation of the lamp and the filling tube of the radiator.

Figure 3 is an enlarged vertical sectional detail of the mechanism for connecting and disconnecting the device with relation to the steering gear of the automobile.

Figure 4 is a horizontal sectional view on the line 4—4 of Figure 3, the plate 35 having been pushed in.

Figure 5 is a vertical sectional view on the line 5—5 of Figure 3.

Referring particularly to the accompanying drawing, 10 represents the upper water chamber of an automobile radiator, which has the filling tube 11. Secured to, and encircling the upper portion of the filling tube 11 is a ring 12 in the upper face of which is formed a circular groove 13 receiving the series of bearing balls, shown at 14. A vertically disposed flat ring 15 is provided with a lower horizontal flange 16, and receives loosely therein the filling tube, above said ring 12, and said flange is disposed to rotate on the said bearing balls. Hinged to the upper edge of the ring 15 is a cover or cap 17. Formed on this cap is the vertically extending lamp casing 18, and in the rear of said casing is mounted the motor meter 19. The lamp casing is arranged to rotate with the cap 17 and ring 15. Disposed vertically through the water chamber 10, directly beneath the filling tube 11, is a tube 20, the lower end of which is secured to the bottom wall of the chamber, while the upper portion extends vertically and centrally within the filling tube, and terminates at a point slightly below the cap 17. Fixed on the upper portion of the tube 21, which is rotatably disposed in the tube 20, is a disk 22, having the radial arms 23, extending upwardly and laterally, where they are secured to the ring 15. The tube 21 extends downwardly through the tube 20 to a point a short distance below the lower end of the tube 20, where it is cut away, on opposite sides to provide the longitudinal slots 24. Within this lower end of the tube 21 is slidably disposed a block 25, having the opposite pins 26 playing in said slots, and whereby said block and tube are capable of simultaneous rotation. The lower end of the block 25 is cut on opposite sides to provide the inclined shoulders 27, which result in the depending central web 28. In the lower face of this web, and longitudinally thereof, there is formed a recess 29. Mounted on the rear of the radiator, a short distance below the lower end of the tube 20, is a bracket 30, and rotatably supported, at its upper end, in the bracket, is the lower section 21' of the tube 21, the lower end of said tube 21' being provided with an arm 31 engaged in an opening in a vertical arm 32 carried by the tie rod 33, of the steering gear, and whereby said section 21' is adapted to rotate as the automobile is steered. The bracket 30 is provided with a slideway 34, in which is slidably disposed the plate 35, of insulation, said plate having a longitudinal bifurcation 36, and a circular opening 37 at the inner end thereof. The upper end of the section 21' is formed with a central flat lug 38 arranged to enter said bifurcation, in one position of the plate 35, whereby to guide said lug into the recess 29, when it is desided to connect the lamp mechanism with the steering gear, and cause the lamp to be steered with the automobile. On the upper face of the inner end of the plate, at opposite sides of the bifurcation, there are formed the inclined faces 36' which are arranged to engage with the faces or shoulders 27, to lift the block 25, whereby to release the lug 38 from the recess 29. It will be understood that the lamp can be connected with, or disconnected from the steering gear, when the lamp casing is directed straight forward, and to maintain the lamp casing in this position, while disconnected from the steering gear, the web 28 is continued downwardly a sufficient distance to engage between the highest portions of the inclined faces 36', as clearly seen in Figure 3. This effectively prevents the tube 21 from turning incident to the jarring of the automobile over the road. Connected to the rear end of the slidable plate 35 is a fork 37', formed on the forward end of a suitable operating rod (not shown), said rod being arranged to extend rearwardly into convenient reach of the driver, at the instrument board. Secured to the other end of the plate 35, and spanning the open end of the bifurcation thereof, is a strap 39, of insulation, which is arranged to engage with the adjacent side of the block 25, whereby to limit the outward or rearward sliding movement of the plate 35, so that reengagement of the parts is assured, upon forward movement of the plate. The fork 37' is arranged to straddle the upper water hose connection of the radiator, whereby to permit the operating rod to extend rearwardly and centrally. Encircling the lower end of the tube 21, and bearing against the bottom wall of the water chamber 10, and said pins 26, is a coil spring 40, which normally urges the block 25 downwardly, so that the recess 29 will properly receive the lug 38. An electric conduit 41 is passed through one of the slots 24 and upwardly to the lamp 42, the other side of the electric circuit being the ground side, or frame 43 of the automobile, whereby when the lug 38 is properly engaged in the recess 29, the circuit is completed, and when disengaged, the circuit is broken. In the latter position, the plate of insulation 35 holds the members 21' and 25 out of metallic contact, thereby interrupting the flow of current, except when the section 25 is permitted to move downwardly into interlocking connection with the section 21'.

From the foregoing it will be understood that, assuming the parts to be in the position shown in Figure 3 the portion 25 is held from any accidental rotation by its engagement with the upper portions of the elevations of the plate 35. The member 21' is free to rotate with the steering gear of the automobile, in view of the fact that the lug 38 is wholly without the bifurcation 36, of said plate. The lamp is thereby held in forwardly directed position. Should the driver desire to connect the lamp with the steering gear, so that said lamp will rotate therewith, and shed light on the inside of the curve of a road, the operator slides the plate 35 forward until the circular opening 37 is directly beneath the member 21, said member being gradually lowered by the force of the spring 40, and the sliding engagement between the inclined faces 27 and 36', when the lug 38 will enter the opening 29, of the member 25, thereby coupling the members 21' and 25 together, and permitting them to be rotated as a unit by the steering mechanism of the automobile, so that the lamp will be turned in the desired direction. Upon rearward sliding movement of the plate 35, the inclined faces 36', thereof, will force the member 25 upwardly, by engagement with the inclined faces 27, and disengage the section 25 from the section 21', thus permitting the latter to rotate freely, with the steering mechanism, and the section 25 to be maintained against any rotative movement by contact of the web with the elevations of the plate 35.

What is claimed is:

1. The combination with the steering mechanism and filling tube of an automobile, of a rotatable cap on the filling tube, a vertical sectional rod disposed through the tube and having one section connected with the cap, the other section of the rod being connected with the steering mechanism, and means for engaging and disengaging the first section of the rod with the second section thereof.

2. The combination with the steering mechanism and radiator filling tube of an automobile, of a rotatable cap on the filling tube, a lamp mounted on the cap, a vertical sectional rod having its upper section disposed in the filling tube and fixed to the rotatable cap, the lower section of the rod being operatively connected with the steering mechanism, said sections being adapted for interlocking connection with each other, and means for moving one of the sections into and out of interlocking connection with the other section.

3. The combination with the steering gear tie rod and a rotatable radiator cap of an automobile, of a vertical rod including an upper section secured to the cap and a lower section operatively engaged with the tie rod, said upper section being movable into and out of interlocking connection with the lower section, and means movable between the sections for connecting and disconnecting the same.

4. The combination with the tie rod and rotary radiator cap of an automobile, of a rod secured to the cap and extending to a point adjacent the tie rod, said rod being formed in separable sections, one of the sections being carried by and operable with the tie rod, and a cam means movable between the sections for connecting and disconnecting the same whereby to cause the said cap to rotate or remain stationary, and a lamp fixed on the said cap.

5. The combination with the tie rod and rotary radiator cap of an automobile, of a vertical rod section secured to said cap and depending therefrom, said section having a socket and cam means, a second vertical rod section mounted below the first section and having a lug for engagement in said socket and being operatively connected with said tie rod, and a cam member slidable between the sections for moving the first section to connect and disconnect the same with respect to the second section.

6. The combination with the tie rod and rotary radiator cap of an automobile, of a vertical rod section secured to and depending from said cap, said section having a socket and inclined shoulders in the lower end, a second vertical rod section having its lower end operatively connected with the said tie rod and having a lug on its upper end for engagement in said socket whereby to permit the sections to rotate as a unit, and a slidable plate movable between the engageable ends of the sections and having cam means for engagement with the first cam means to elevate the first section out of engagement with the second section, and resilient means for urging said first section into engagement with the second section.

7. A combined filling tube and lamp support comprising a filling tube proper, a guiding tube within the filling tube, an operating tube within the guiding tube and rotatable therein, the filling tube having a flange supporting bearings, a lamp base carrying a lamp and resting on the bearings for rotary movement, and a spider connected to the operating tube and to said base.

In testimony whereof, I affix my signature.

HAROLD E. MOUSE.